Jan. 16, 1968 J. P. GARNO ETAL 3,364,079
METHOD OF MAKING LOW RESISTANCE OHMIC CONTACT TO P-TYPE LEAD TELLURIDE
Filed June 25, 1965
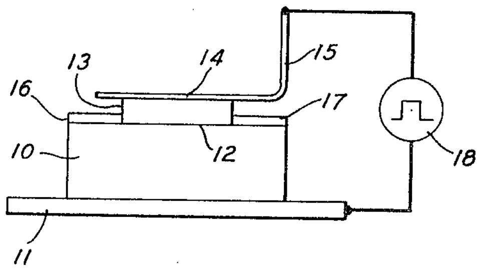
INVENTORS J. P. GARNO
C. A. NANNEY
BY [signature]
ATTORNEY United States Patent Office 3,364,079

Patented Jan. 16, 1968

3,364,079
METHOD OF MAKING LOW RESISTANCE OHMIC CONTACT TO P-TYPE LEAD TELLURIDE

John P. Garno, New Providence, and Cecil A. Nanney, Murray Hill, N.J., assignors to Bell Telephone Laboratories, Incorporated, New York, N.Y., a corporation of New York Filed June 25, 1965, Ser. No. 466,962
4 Claims. (Cl. 136—237)

ABSTRACT OF THE DISCLOSURE

This application describes a method for making a low resistance ohmic contact to a body of p-type lead telluride which includes the steps of placing a tellurium-rich mixture of lead and tellurium between the p-type lead telluride body and a contacting member chosen from the group including gold, silver and platinum. The mixture is alloyed to the body and bonded to the contacting member by heating the mixture to a temperature above its melting point but below 500° C.

It is found that contacts made in accordance with the invention have contact resistances at cryogenic temperatures that are several orders of magnitude less than contacts made by other known means.

This invention relates to a method for making low resistance contact to p-type lead telluride. More particularly, the contact produced in accordance with the present invention is a low resistance, essentially ohmic contact which retains its low resistance at cryogenic temperatures.

Lead telluride (PbTe) is a semiconducting IV–VI compound. Heretofore, it has been of interest primarily as a thermoelectric material. More recently, however, injection lasers have been fabricated of this material, and studies indicate that PbTe may have other device applications. In many of these devices, operation is advantageously at cryogenic temperatures and high current densities. It is for these reasons that a solution to the problem of making a low temperature, low resistance contact to p-type PbTe is of interest.

Contacts which were both essentially ohmic and low resistance at cryogenic temperatures have been secured to n-type PbTe by soldering such elements as bismuth, lead and tin directly to the crystal. However, each of these materials, and other commonly used elements, when soldered to a crystal of p-type PbTe, produce a contact which shows a significant increase in resistance when cooled to liquid nitrogen and liquid helium temperatures. In addition, the contacts produced are rectifying contacts.

In United States Patent 2,865,794, there is described a process for making contact to p-type-conductivity lead telluride which comprises fusing tellurium metal to the p-type material. It has been found, however, that contacts made in the manner described in the above-identified patent have relatively high resistance and exhibit non-ohmic properties at current densities above 2 amps/cm.$^2$. Furthermore, these contacts exhibit a substantial increase in resistance at cryogenic temperatures.

In accordance with a preferred embodiment of the present invention, low resistance, ohmic contact to p-type lead telluride is produced by placing a tellurium-rich mixture of lead and tellurium, such as is obtained in the eutectic mixture of lead and tellurium, between a crystal of p-type lead telluride and a gold wire, and simultaneously alloying the Pb-Te mixture with the p-type material and bonding the gold wire to the tellurium-rich material. Advantageously, alloying and bonding is accomplished by means of a short pulse of current.

We have found that contacts made as just described have a room temperature resistance that is less than half the room temperature resistance of contacts made in accordance with the prior art, such as using gold or pure tellurium. At cryogenic temperatures (such as at the temperature of liquid helium), the resistance of contacts made in accordance with the invention is less than one hundredth the resistance of prior art contacts. Finally, contacts made in accordance with the invention exhibit good ohmic characteristics at cryogenic temperatures up to current densities of the order of 200 a./cm.$^2$, whereas prior art contacts start to exhibit strong non-ohmic behavior at current densities as low as 2 a./cm.$^2$.

These and other objects and advantages, the nature of the present invention, and its various features, will appear more fully upon consideration of the illustrative embodiment now to be described in detail in connection with the accompanying drawing, which shows the physical arrangement of materials to form a contact to a crystal of p-type PbTe in accordance with the invention. The crystal 10 of p-type PbTe, shown resting on a conductive plate 11, is cleaned by gently lapping its upper surface 12 and washing with some suitable solvent, such as alcohol. A pellet 13 of tellurium-rich material is placed upon surface 12, and the flattened end 14 of a piece of wire 15 is placed upon the upper surface of the eutectic material.

Considered solely from the standpoint of resistivity, it would appear that a mixture of equal atomic parts of lead and tellurium would produce an ohmic contact to p-type PbTe having the lowest contact resistance. However, the melting point of lead-tellurium mixtures increases rapidly with increasing lead content from a minimum at the eutectic mixture ($Pb_{14}Te_{86}$), to 500° C. for a 20% lead, 80% tellurium mixture. This sets a practical upper limit on the amount of lead that can be included in the mixture since deleterious irreversible effects occur in lead-telluride at temperatures above 500° C., as reported by E. H. Putley, in the Proceedings of the Physical Society, London, B68, 22 (1958).

As the lead content decreases below that contained in the eutectic mixture, the contact resistance increases rapidly. The tabulation below gives the contact resistance at cryogenic temperatures for different mixtures of lead and tellurium:

| Material: | Contact resistance at 4.2° K. |
|---|---|
| $Pb_0Te_{100}$ | ~6000$\mu\Omega$-cm.$^2$ |
| $Pb_5Te_{95}$ | ~1500$\mu\Omega$-cm.$^2$ |
| $Pb_{14}Te_{86}$ (eutectic) | 30–150$\mu\Omega$-cm.$^2$ |

As can be seen from the tabulation, pure tellurium is the poorest contact material, as it produces a contact having the highest contact resistance. A five percent lead content results in a substantial improvement over a pure tellurium contact, while a eutectic mixture results in a further reduction in contact resistance of over an order a magnitude. Higher lead content leads to a still further decrease in contact resistance.

While a lead content of as little as five percent produces a significant reduction in contact resistance, for those applications contemplated by the invention, concentrations between about 10 to 20 atomic percent of lead represent a preferred range. A eutectic mixture of 14 percent lead is used advantageously since the melting temperature for this mixture is the lowest.

The wire 15 is made of a material, such as platinum, gold or silver, that has a melting point that is higher than the melting point of the lead-tellurium mixture used for the contact material, and that does not react deleteriously or form a rectifying junction with the mixture. Additionally, for cryogenic applications, the wire material should permit a low resistance connection to the contact at cryogenic temperatures. In these regards, a gold wire has been found to be advantageous.

A current generator 18, connected between the gold wire 15 and plate 11, provides the power for alloying the eutectic mixture to the crystal 10 and bonding to the wire 15. Typically, current pulses of between 10 to 100 amperes, lasting for a period of a few tenths of a second have given consistently good results. The exact pulse amplitude and duration are not critical, however, so long as it is adequate to melt the eutectic material. Nevertheless, it is advantageous that the time duration of the alloying step be short in order to minimize any tendency for oxidation.

In order to control the final thickness of the eutectic mixture layer, a pair of shims 16 and 17, made of a suitable material, such as mica, are placed on either side of pellet 13. As the eutectic melts during the alloying and bonding step, the gold wire, which is under slight pressure, settles and comes to rest on the shims.

Contacts made to p-type PbTe in the manner described above have given consistently good results. As an example, contact was made to a 2 mm. by 2 mm. crystal of p-type lead-telluride (grown from an undoped mixture of equal parts of lead and tellurium) having a resistivity of $3 \times 10^{-3}$ ohm cm. A ½ mm. cubic pellet of a eutectic mixture of lead and tellurium was placed between two 0.025 mm. mica shims, and a 10 mil gold wire was placed upon the pellet. A current, whose amplitude and time duration could be controlled, was passed through the pellet until it was observed to melt. Observations were made through a microscope. The resulting contact area between the eutectic mixture and the crystal was approximately 1 mm. by 1.5 mm., for which the sum of the contact resistance and the eutectic mixture layer resistance was 30 milliohms at 300° K., and 2–10 milliohms at 4.2° K. Furthermore, the contact was essentially ohmic, exhibiting slight non-ohmic behavior only after current densities exceeded 200 amperes per cm.$^2$.

Analysis indicates that the major portion of the resistance is due to the eutectic layer. Accordingly, still lower resistance contacts can be made by using smaller shims to produce thinner eutectic mixture layers.

In all cases it is understood that the above-described arrangement is illustrative of but one of the many possible specific embodiments which can represent applications of the principles of the invention. Numerous and varied other arrangements can be readily devised in accordance with these principles by those skilled in the art without departing from the spirit and scope of the invention.

What is claimed is:

1. The method of fabricating a low resistance contact to a body of p-type lead telluride comprising the steps of:
   placing a pellet of material consisting essentially of a eutectic mixture of lead and tellurium upon a surface of said body;
   placing an end of a gold wire upon said pellet of material;
   and simultaneously alloying said material to said body of p-type lead telluride and bonding said wire to said material.

2. The method according to claim 1 wherein the end of said wire is flattened and wherein said alloying and bonding is accomplished by passing a short plus of current through said eutectic mixture of lead and tellurium.

3. The method of fabricating a lead telluride device for operation at low temperatures comprising the steps of;
   positioning on a p-type wafer of lead telluride a pellet consisting essentially of a mixture of lead and tellurium wherein the tellurium content lies in a range of 80–90 atomic percent,
   positioning on the pellet a contacting member selected from the group consisting of gold, silver and platinum;
   and heating the assembly to a temperature between the lead-tellurium eutectic temperature and 500° C. for a time sufficient to bond the pellet to the wafer and the contacting member to the pellet.

4. A lead-telluride device made in accordance with the method of claim 3.

References Cited

UNITED STATES PATENTS

| | | | |
|---|---|---|---|
| 3,000,092 | 9/1961 | Suro | 29—155.5 |
| 3,037,065 | 5/1962 | Hockings | 138—237 |
| 3,232,719 | 2/1966 | Ritchie | 29—155.5 |
| 3,247,473 | 4/1966 | Allen | 29—155.5 |

HYLAND BIZOT, *Primary Examiner.*